United States Patent [19]

Mason

[11] Patent Number: 4,471,676

[45] Date of Patent: Sep. 18, 1984

[54] MACHINE TOOL INCLUDING WORKPIECE CLAMP SENSOR

[75] Inventor: Graham A. Mason, London, Canada

[73] Assignee: Joseph Rhodes Limited, Wakefield, England

[21] Appl. No.: 299,293

[22] Filed: Sep. 3, 1981

[30] Foreign Application Priority Data

Feb. 23, 1981 [GB] United Kingdom ............... 8105597

[51] Int. Cl.$^3$ ............................................. B26D 5/30
[52] U.S. Cl. ......................................... 83/13; 83/71; 83/72; 83/412; 364/474
[58] Field of Search ............... 364/474, 475, 167–171; 83/71, 72, 410, 412, 552, 375, 452, 453, 13; 408/3, 8, 12, 710; 409/134, 188, 189, 903

[56] References Cited

U.S. PATENT DOCUMENTS

| | | | |
|---|---|---|---|
| 3,349,658 | 10/1967 | Johns et al. | 83/71 |
| 3,448,645 | 6/1969 | Graf et al. | 83/71 |
| 3,603,187 | 9/1971 | Bredow | 83/62 |
| 3,902,389 | 9/1975 | Brown et al. | 83/552 X |
| 4,162,641 | 7/1979 | Stubbings | 83/412 X |

Primary Examiner—Joseph F. Ruggiero
Attorney, Agent, or Firm—Banner, Birch, McKie & Beckett

[57] ABSTRACT

A method is disclosed for sensing the position of a workpiece clamp on a workpiece positioning assembly of a computer-controlled machine tool such as a turret punch press including an X-axis traverse, a Y-axis traverse and, a workpiece support movable along the X-axis traverse and carrying the workpiece support. The method consists of the steps of providing a datum position on the X-axis for the control, providing a datum position on the Y-axis for the control, providing a datum position on the turret for the control, moving the member to the datum position on the X-axis at the beginning of each operating sequence, registering movement of the member along the X-axis traverse, moving the member passed sensor means to identify for the control the position of the member relative to the datum position on the X-axis. Apparatus for carrying out the method is also provided.

9 Claims, 10 Drawing Figures

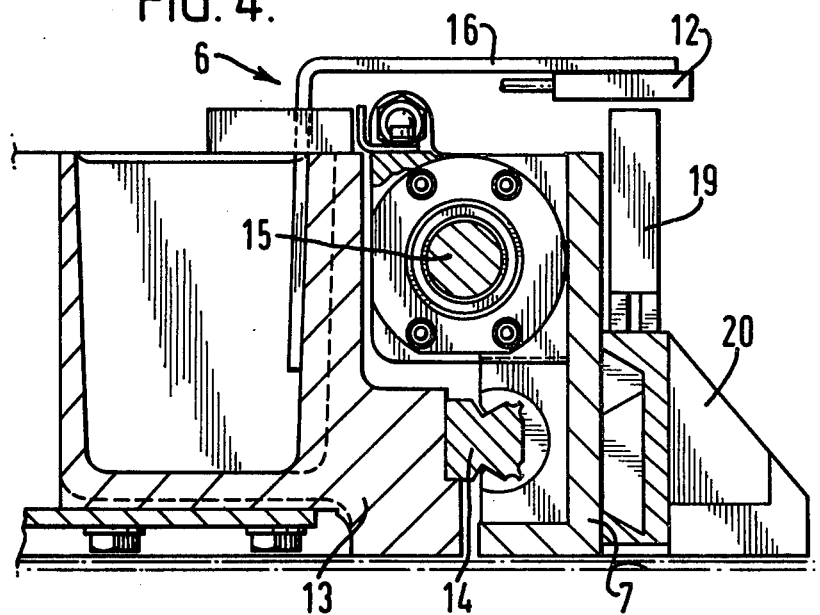
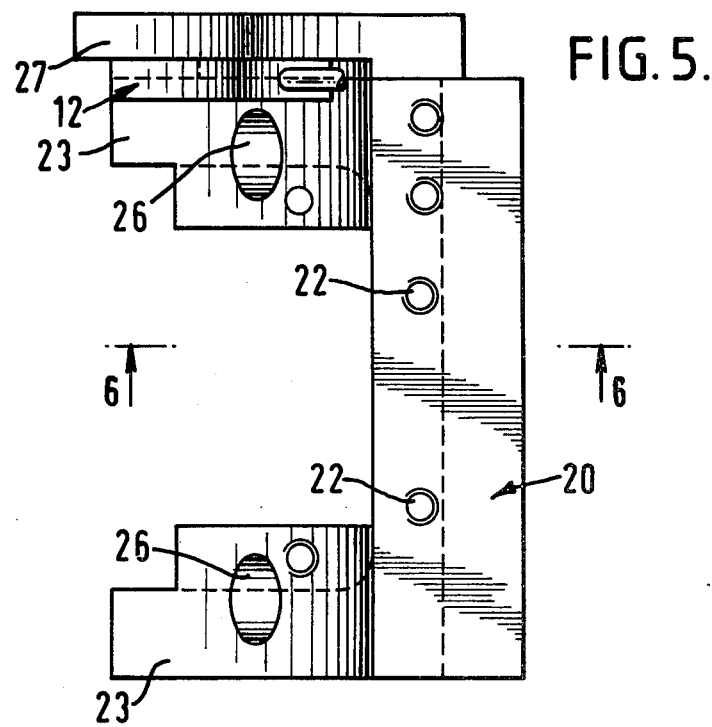

MACHINE TOOL INCLUDING WORKPIECE CLAMP SENSOR

This invention relates to a computer controlled machine tool including a workpiece clamp sensor for preventing the workpiece clamp from being punched, milled or the like.

On a machine tool such as a punch press the workpiece, e.g. a sheet of metal, is moved on X and Y axes by means of a workpiece positioning assembly. The assembly comprises a Y-axis traverse fixed to the frame, a movable X-axis traverse carried by the Y-axis traverse, and, movable along the X-axis traverse, a workpiece carriage having two or more workpiece clamps for holding the workpiece and supporting it for movement relative to the punching head. Workpiece clamp sensors are used to prevent the punching head actually punching the clamp when punching near the edge of the sheet.

At present the sensing arrangement, on a turret punch press for example, may consist of a sensor on the Y-axis and two separate sensors on the X-axis operative once the Y-axis sensor is actuated and arranged to be triggered by upstanding plates on the clamps themselves. The computer control is then operative to create a dead area for each clamp when the associated plate triggers a sensor; the dead area being the same for each punch station and therefore large enough to accommodate the largest punch size. However such an arrangement means that an unnecessarily large dead area is created in many cases.

An object of the present invention is to provide an improved arrangement for sensing the position of a workpiece clamp.

According to the present invention there is provided a method for sensing the position of a member such as a workpiece clamp on a workpiece positioning assembly of a computer-controlled machine tool including an X-axis traverse, a Y-axis traverse and, a workpiece support movable along the X-axis traverse, the workpiece clamp being positioned on the workpiece support, the method comprising the steps of (a) providing a datum position on the X-axis for the control, (b) registering movement of the member along the X-axis traverse, and (c) before operation, moving the member passed sensor means to identify for the control the position of the member relative to the datum position on the X-axis.

The method preferably also includes, between step (a) and step (c), the additional step (d) of moving the member to the datum position on the X-axis at the beginning of each operating sequence. According to another aspect of the invention there is provided a method of sensing the position of a workpiece clamp on a workpiece positioning assembly of a computer-controlled turret punch press including an X-axis traverse, a Y-axis traverse and, a workpiece support movable along the X-axis traverse, the workpiece clamp being positioned on the workpiece support, the method comprising the steps of providing a datum position on the X-axis for the control, providing a datum position on the Y-axis for the control, providing a datum position on the turret for the control, registering movement of the workpiece support along the X-axis traverse, providing sensor means on the X-axis traverse, and moving the workpiece clamp passed the sensor means to identify for the control the position of the member relative to the datum position on the X-axis traverse, the control then being operative to follow the position of the or each workpiece clamp and to create a dead area about a workpiece clamp of a size determined by the punch station indexed relative to the turret datum when the workpiece clamp is in the vicinity of the punch station.

According to another aspect of the invention there is provided a computer controlled machine tool comprising a control, a working head, a workpiece positioning assembly for moving a workpiece relative to the working head and including an X-axis traverse, a Y-axis traverse, a workpiece support movable along the X-axis traverse, and a workpiece clamping assembly on the support for holding a workpiece, a datum position on the X-axis traverse, and sensor means for sensing and computing the position of the workpiece clamping assembly relative to the datum position on the X-axis traverse, the control means, at the start of each operating sequence, being operative to pass the workpiece clamp assembly passed the sensor means to identify the position of the workpiece clamp assembly.

Preferably there are two clamps and the sensor means is operable to provide information whereby the control can know the actual positions of the workpiece clamps.

The movement of the workpiece support along the X-axis traverse is registered by means of a feedback from the operating DC servo motor drive to the control and movement of the X-axis traverse along the Y-axis traverse is similarly recorded. The control computes these signals by determining the speed of rotation of the respective electric drives so that, with a driven lead screw of predetermined pitch the movement of the respective part can be exactly calculated.

The invention will now be described by way of example with reference to the accompanying diagrammatic drawings in which:

FIG. 4 is a sectional side elevation of the X-axis traverse in more detail;

FIG. 5 is a plan view a clamp mounting member;

Figure 3:
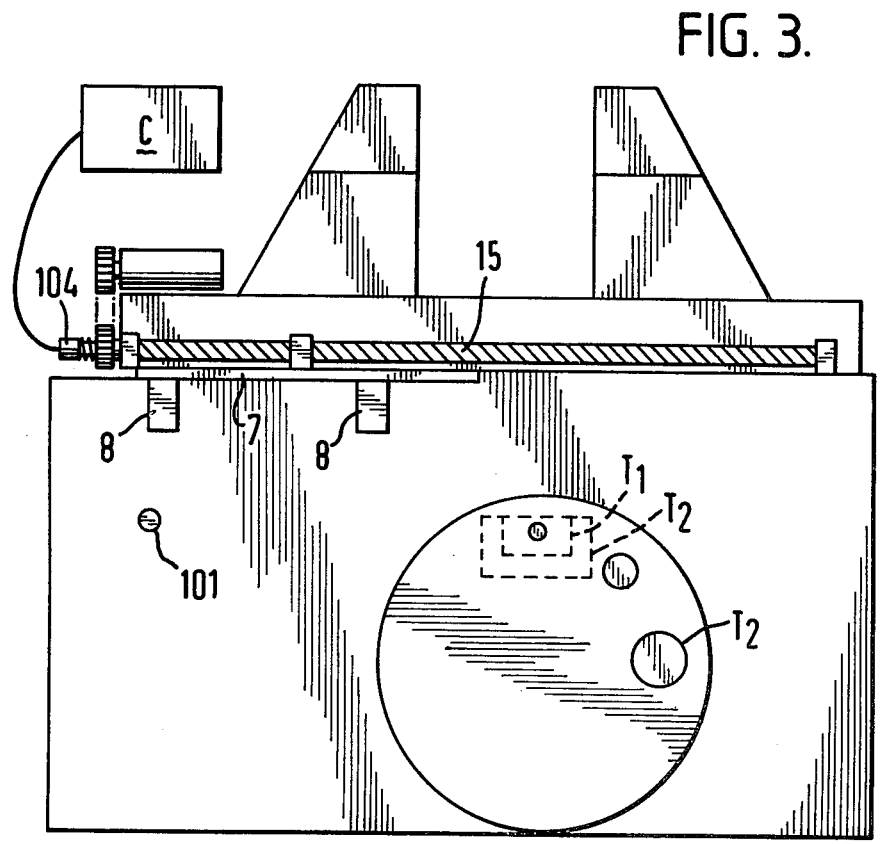
FIG. 3 is a diagrammatic plan view of the punch press of FIG. 1.

In the drawings a punch press has a C-shaped frame 1 consisting of an upper limb 2 and a lower limb 3 which define a throat 4. Secured to the lower limb 3 are horizontally-spaced bearing rails 5 of the Y-axis traverse which support the X-axis traverse 6 for movement in the direction of the throat 4. Movable along the X-axis traverse is a workpiece carriage 7 having two spaced workpiece clamps 8 which can be selectively positioned as desired on the carriage 7 according to the workpiece being supported. With computer-controlled machines it is necessary at the start of an operation to tell the computer the starting position and therefore a datum position for the X-axis traverse is shown at 9 used in conjunction with a retractable datum pin 101 (FIG. 3) against which a sheet abuts in the datum position. In addition, a datum position 102 (FIG. 9) is provided for the computer control C for the Y-axis traverse and also a datum position 103 (FIG. 1) for the turret position.

Figure 1:
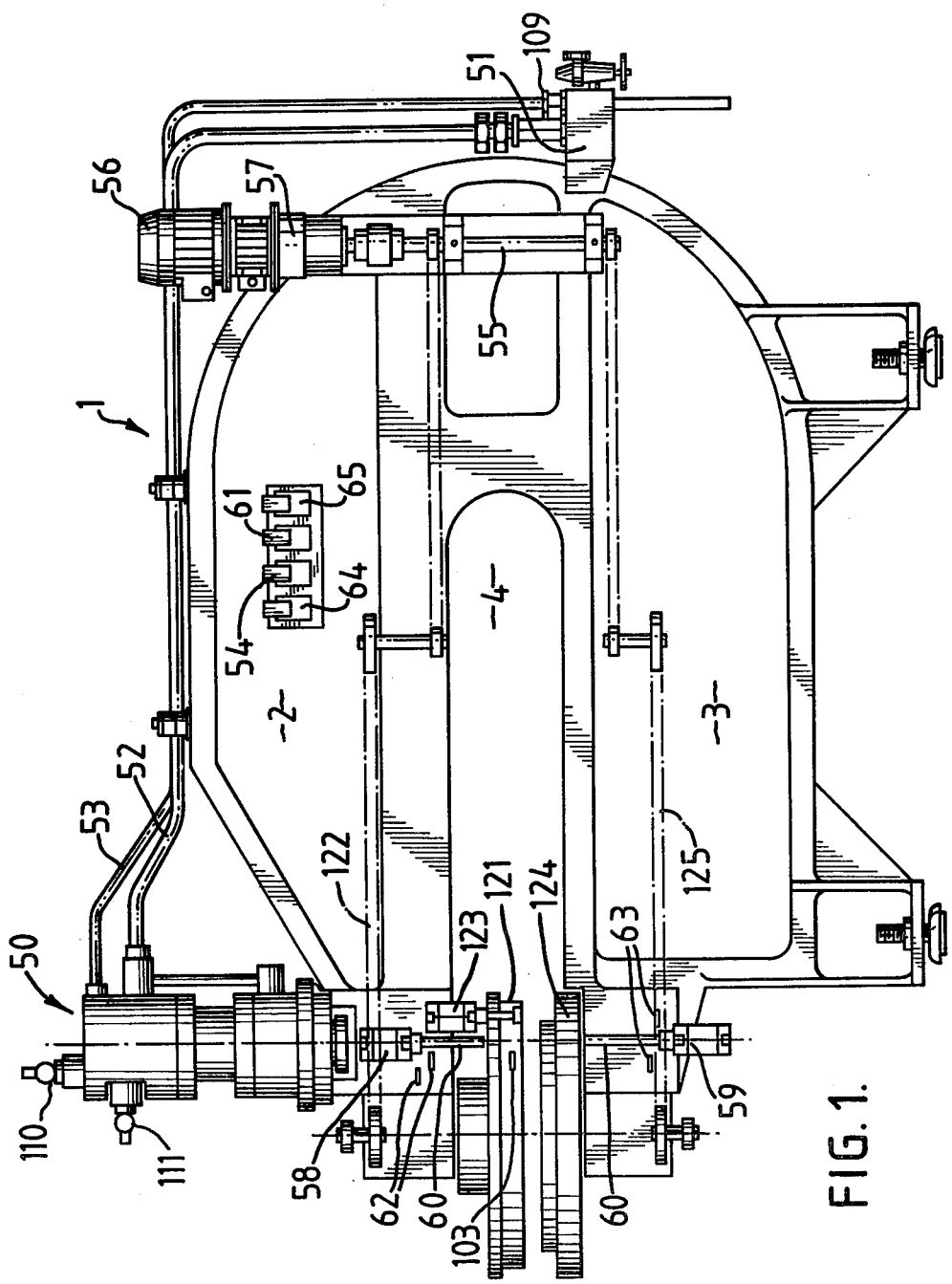
FIG. 1 is a side elevation of a punch press having a C-shaped frame with the work piece positioning assembly omitted for clarity.
Figure 2:
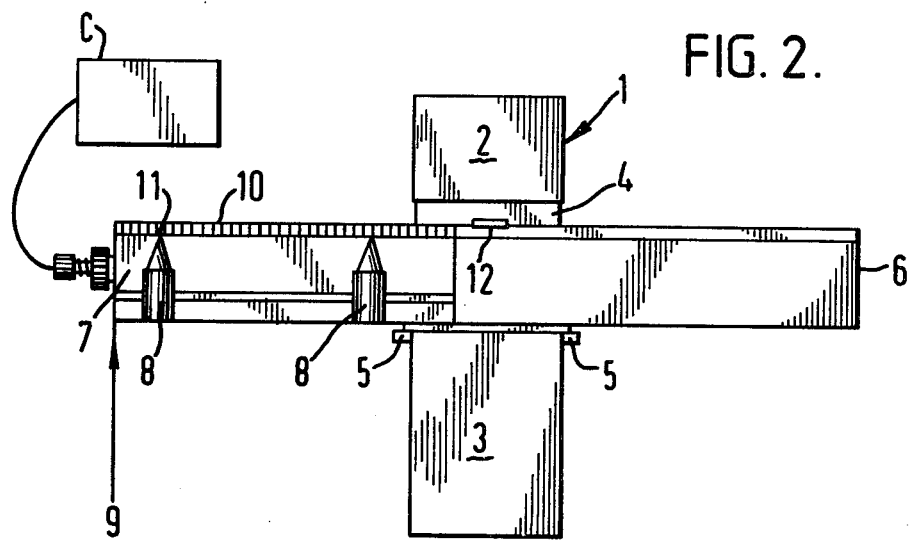
FIG. 2 is a diagrammatic front view of the punch press.

From FIG. 1 it will be seen that, in the preferred arrangement, the free end of the upper limb 2 supports a hydraulic ram assembly 50 and an upper turret 121. The hydraulic ram assembly 50 is supplied with hydraulic fluid from a reservoir (not shown) and flow is controlled by a hydraulic manifold 51. The hydraulic fluid passes to the ram assembly 50 through hydraulic pressure pipe 52 and fluid returns on ram retraction through pipe 53.

The upper turret 121 is provided with roller chain or belt drive 122 for rotating the turret into a desired angular position to bring a desired punch below the operative position of the hydraulic ram assembly 50. The workpiece may be locked in position for clamp reposition by means of a pair of retractable clamping mechanisms 123 the operation of which is controlled by reposition solenoid 54.

Disposed below the upper turret 121, on the lower limb 3, is a lower turret 124. The lower turret 124 also has a roller chain or belt drive 125 and the two drive means are connected to a common turret drive shaft 55 driven by a single drive motor 56 so that the movement of the two turrets are synchronised: a turret clutch/brake for the drive shaft 55 being provided at 57.

Disposed at the front of the machine, and on each of the upper and lower limbs 2 and 3, are respective upper and lower turret wedge assemblies 58, 59, each of which include a reciprocal locking member 60 operated by turret wedge solenoid 61. In order to determine the position of the locking member 60 respective pairs of wedge sensors 62, 63 are provided on the upper and lower limbs. The wedge assemblies 58, 59 lock the respective turrets in position after indexing a desired punch station by engaging location pins (not shown) on the turret so that, during punching, the turrets are accurately positioned relative to the hydraulic ram assembly 50. The locking member 60 engage one of a plurality of bull-nosed location pins (not shown) in the respective turret. Also shown in FIG. 1 are sheet clamp solenoid 64 and datum pin solenoid 65 for the clamps 8 and datum pin 101 respectively.

In accordance with the invention, instead of having two sensors positioned on the X-axis and one on the Y-axis as before, a single sensor 12 is provided suitably midway between the ends of the X-axis traverse: the position of the sensor being fixed and recorded by the computer control.

FIGS. 4 to 8 show the sensing arrangement of the present invention in more detail and it will be seen that the X-axis traverse 6 comprises an elongate rigid beam 13 supporting a single bearing rail 14 and a driven lead screw 15. The workpiece carriage 7 is supported on the bearing rail 14 and is in driving connection with the lead screw 15 for movement along the traverse. The sensor 12 is mounted on the underside of a mounting bracket 16 rigidly secured to the beam 13.

Figure 6:
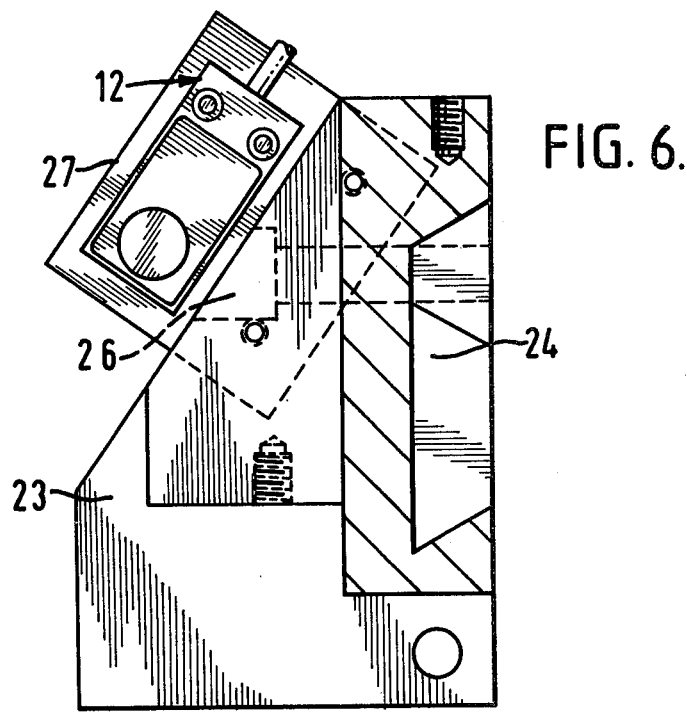
FIG. 6 is a section on 5—5 in FIG. 4.
Figure 7A:
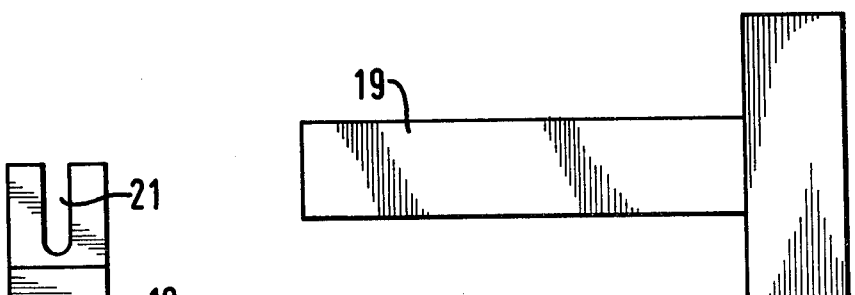
FIGS. 7a and 7b are a side elevation and plan view of a preferred form of sensor actuator.
Figure 7B:
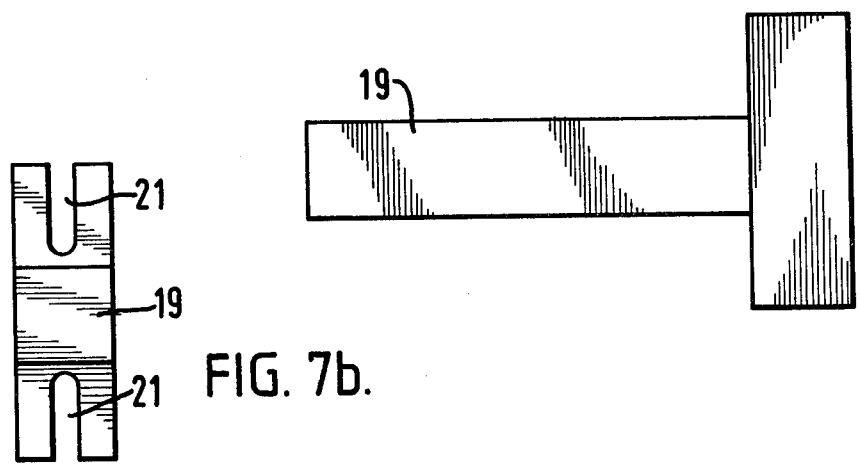
Figure 8:
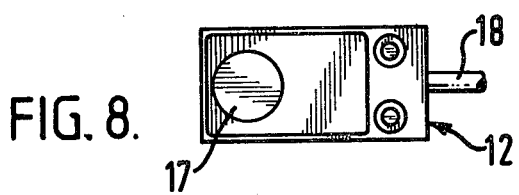
FIG. 8 is an underneath plan view of a preferred form of sensor.

The sensor 12 is a proximity switch having an active face 17 and is operative to transmit a signal via cable 8 to the control C on sensing one of sensor actuators 19 carried by the workpiece clamp assemblies 8. The sensor actuators 19 are secured one to the top of each clamp mounting plate 20, by screws passing through base slots 21 into holes 22 in the mounting plate 20. In FIGS. 4, 5, and 6 the clamps themselves are not shown for clarity but the mounting plates 20 each support a clamp and the clamps are preferably of the construction disclosed in our co-pending European Pat. No. 0038198 to which reference is directed.

A clamp is received between side arms 23 of the respective mounting plate 20 and may be moved along the workpiece carriage 7 by the dovetail groove 24 and rollers 25 cooperating with a corresponding surface (not shown) on the front face of the workpiece carriage 7. The clamp mounting plates 20 are locked in position by locking screws (not shown) which pass through holes 26 in each side arm 23. The distance between the top of the sensor actuators 19 and the sensor 12 as they pass below is suitably about 3 to 4 mm.

Preferably, as shown in FIGS. 5 and 6, the clamp mounting plates 20 each include a further single proximity switch 27 for detecting loosening of the adjacent locking screw in the side arm 23 or the introduction of an Allen key indicating relocation of the clamps.

Figure 9:
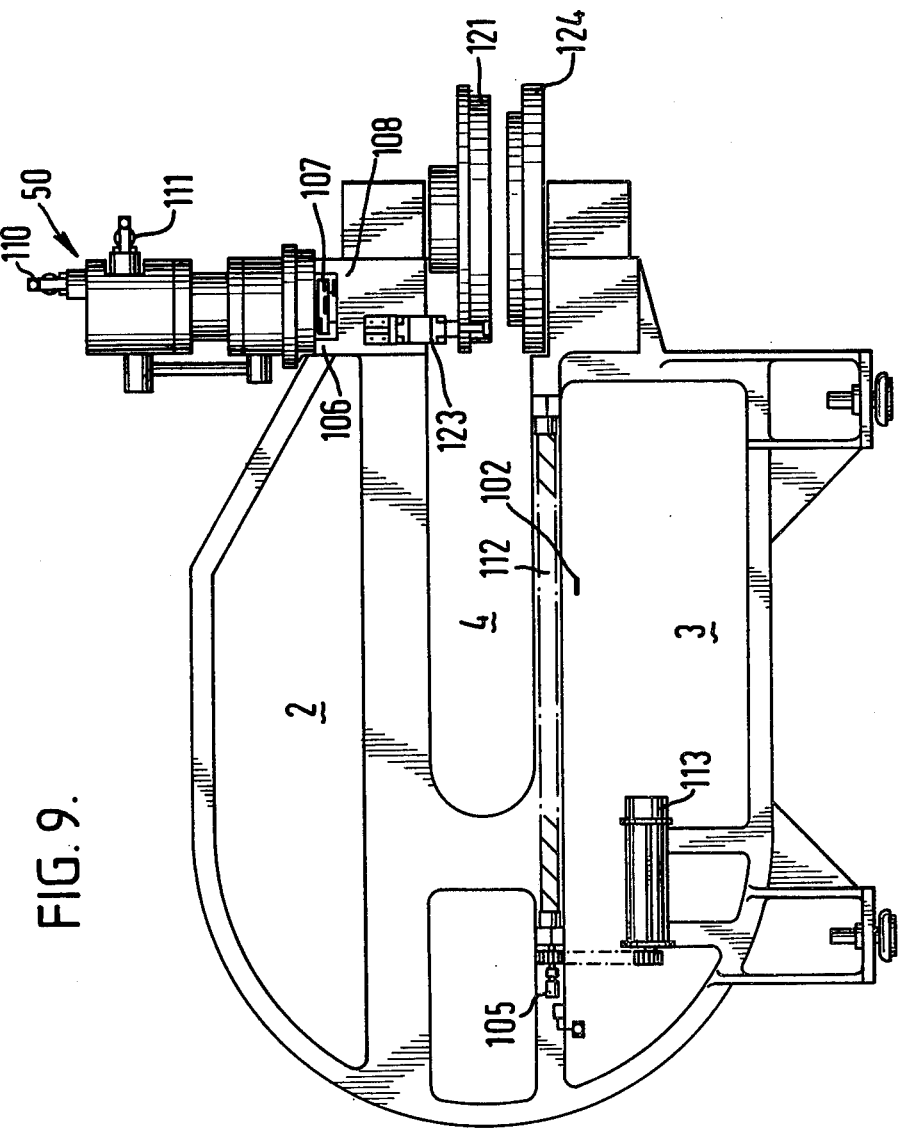
FIG. 9 is an opposite side elevation to that shown in FIG. 1.

The movement of the workpiece carriage 7 along the X-axis traverse 6 is registered by means of X-axis resolver 104 (FIG. 3) and movement of the X-axis traverse 6 along the Y-axis traverse is similarly recorded by Y-axis resolver 105:

The Y-axis lead screw 112 being driven by motor 113 (FIG. 9). From FIG. 9 it will be seen that additional sensors 106, 107 and 108 are provided for determining the position of the ram, the sensors indicating respectively the position of the ram when it is at the top of its stroke, its position when the punch is clear of the sheet being punched, and its position when the bottom of its stroke is reached. The sensor 108 is operative to energise solenoid 109 to move the ram up and to deenergise solenoids 110, 111 in the hydraulic circuit. As the ram moves up the sensor 107 sends a signal to the control C that the punch has cleared the sheet and the control C then energises the solenoids 110, 111 to drive the ram down again.

The computer programme is arranged so that, before an operation can begin, the workpiece carriage must move past the sensor 12, preferably to the other end of the beam, so that the positions of the clamps can be computed. Alternatively, the sensor may be used to check the position of the clamps relative to the datum with respect to information fed into the control by the operator.

Therefore, at any time, the computer control always knows the position of the clamps and accordingly there should be no inadvertent punching of the clamps. As the computer now knows the position of workpiece clamps the dead area may be created automatically of a size according to the punch station indexed e.g. $T_1$ and $T_2$ thereby creating a smaller dead area for a smaller punch than for a larger punch: movement of the workpiece carriage along the X-axis traverse or the X-axis traverse along the Y-axis traverse being registered by means of a feed back from the respective operating DC servo motor drive to the control C as explained above.

The system of the present invention, although described by way of example with reference to a punching machine, may be used on other machine tools. The sensor may be arranged only to check the position of the clamps at the beginning of an operation or continually during a programme cycle.

I claim:

1. A method for sensing the position of a member such as a workpiece clamp on a workpiece positioning assembly of a computer-controlled machine tool including an X-axis traverse, a Y-axis traverse and, a workpiece support movable along the X-axis traverse, the workpiece clamp being positioned on the workpiece support, the method comprising the steps of (a) providing a datum position on the X-axis for the control, (b) registering movement of the member along the X-axis traverse, and (c) identifying for the control the position of the member relative to the datum position on the X-axis by moving the member passed sensor means.

2. A method for sensing the position of a member such as a workpiece clamp according to claim 1 comprising between step (a) and step (c), the additional step (d) of moving the member to the datum position on the X-axis whenever identifying for the control the position of the member.

3. A method of sensing the position of a workpiece clamp relative to the working head of a machine tool according to claim 1 or 2 comprising the additional steps of (e) providing a datum position on the Y-axis for the control, (f) recording the position of the machine tool head relative to the datum positions, and (g) registering movement of X-axis traverse on the Y-axis traverse.

4. A method of sensing the position of a workpiece clamp on a workpiece positioning assembly of a computer-controlled turret punch press including an X-axis traverse, a Y-axis traverse and, a workpiece support movable along the X-axis traverse, the workpiece clamp being positioned on the workpiece support, the method comprising the steps of providing a datum position on the X-axis for the control, providing a datum position on the Y-axis for the control, providing a datum position on the turret for the control, registering movement of the workpiece support along the X-axis traverse, providing sensor means on the X-axis traverse, and moving the workpiece clamp passed the sensor means to identify for the control the position of the member relative to the datum position on the X-axis traverse, the control then being operative to follow the position of the workpiece clamp and to create a dead area about a workpiece clamp of a size determined by the punch station indexed relative to the turret datum when the workpiece clamp is in the vicinity of the punch station.

5. A computer controlled machine tool comprising a control, a working head, a workpiece positioning assembly for moving a workpiece relative to the working head and including an X-axis traverse, a Y-axis traverse, a workpiece support movable along the X-axis traverse, and a workpiece clamping assembly on the support for holding a workpiece, a datum position on the X-axis traverse, and sensor means for sensing and computing the position of the workpiece clamping assembly relative to the datum position on the X-axis traverse, the control means being operative to pass the workpiece clamp assembly passed the sensor means to identify the position of the workpiece clamp assembly.

6. A computer controlled machine tool according to claim 5 comprising a datum position on the Y-axis, and means for registering movement of the X-axis traverse on the Y-axis traverse.

7. A computer controlled machine tool according to claim 6 comprising electric drive means for driving the workpiece support along the X-axis traverse, and electric drive means for driving the X-axis traverse along the Y-axis traverse.

8. A computer controlled machine tool according to claim 5 wherein the sensor means comprises a sensor on the X-axis traverse, and an actuator on the workpiece support along the X-axis traverse.

9. A computer controlled machine tool according to claim 8 wherein the means for registering movement of the X-axis traverse on the Y-axis traverse and means for registering movement of the workpiece support along the X-axis traverse comprises means registering the speed of rotation of respective electric drive means for driving the workpiece support along the X-axis traverse, and the X-axis traverse along the Y-axis traverse.

* * * * *